United States Patent [19]
Christensen et al.

[11] Patent Number: 5,644,577
[45] Date of Patent: Jul. 1, 1997

[54] PRESERVING DATA FRAME CONTINUITY ACROSS FULL-DUPLEX LAN INTERFACE WITH DISPARATE DATA CAPACITIES

[75] Inventors: Kenneth Jussi Christensen, Apex; Lee Clyde Haas, Raleigh; Francis Edward Noel, Jr., Durham, all of N.C.

[73] Assignee: International Business Machines Corporation, Armonk, N.Y.

[21] Appl. No.: 553,945

[22] Filed: Nov. 6, 1995

Related U.S. Application Data

[63] Continuation of Ser. No. 257,265, Jun. 9, 1994, abandoned.
[51] Int. Cl.$^6$ .................................. H04J 3/07; H04J 3/12
[52] U.S. Cl. .................................. 370/506; 370/528
[58] Field of Search .................................. 370/61, 77, 80, 370/82, 84, 102, 110.1, 110.4, 111, 13, 56, 94.1, 420, 423, 424, 505–508, 434, 465, 470, 472, 476, 522, 528, 527, 276, 537, 538; 375/237, 363, 372

[56] References Cited

U.S. PATENT DOCUMENTS

| | | | |
|---|---|---|---|
| 4,437,183 | 3/1984 | Projet | 370/111 |
| 4,926,448 | 5/1990 | Kraul et al. | 375/121 |
| 4,937,820 | 6/1990 | Kawula | 370/111 |
| 5,161,151 | 11/1992 | Kimura et al. | 370/13 |
| 5,253,274 | 10/1993 | Janniello et al. | 370/111 |
| 5,293,377 | 3/1994 | Gould | 370/94.1 |
| 5,355,366 | 10/1994 | Li et al. | 370/111 |

*Primary Examiner*—Douglas W. Olms
*Assistant Examiner*—Chau T. Nguyen
*Attorney, Agent, or Firm*—Joscelyn G. Cockburn; Homer L. Knearl

[57] ABSTRACT

Data capacity mismatches between a communication node, including end node work stations, and a communication link usually require large buffer storage to prevent the loss of transmitted data frames due to transmission of an incomplete frame. Transmitted data frame continuity is maintained in the present invention by using small FIFO buffers in the node to store small portions of a data frame as data is sent and received. In addition, the data frame is maintained by stretching the transmitted frame on the link when necessary to prevent loss of the frame and compress the stretched frame when it is received from the link. The stretching and compressing is accomplished by inserting and removing non-data symbols, or command code words, in the transmitted and received string of data words. Small FIFO buffers (much less than a data frame in data capacity) operate on the fly to transmit and receive data without requiring contiguous transmission of a complete frame. At the sending node, non-data symbols are inserted in the frame between data words to fill gaps between strings of data bytes. At the receiving node, the non-data symbols are stripped from the received data frame to separate non-data symbols from data bytes. The non-data symbols are encoded command code words used to communicate status between the transmitting node and the receiving node. Transmitted encoded commands convey to a receiving node the status information of the transmitting node. The commands include Ready and Busy to indicate to the node at the opposite end of the link the status of the receive FIFO buffer in the node sending the commands.

20 Claims, 7 Drawing Sheets

| TRANSITION NO. | CONDITION | ACTION |
|---|---|---|
| 1 | RECEIVE READY | NONE |
| 2 | RECEIVE BUSY | NONE |
| 3 | RX FIFO<HI THRESHOLD | NONE |
| 4 | RX FIFO>HI THRESHOLD | NONE |
| 5 | NOT ((TX FIFO EMPTY) OR (BLOCKED)) AND (((OVER) AND (B FLAG = TRUE)) OR ((UNDER) AND (B FLAG = FALSE))) | TRANSMIT ENCODED DATA WORD |
| 6 | NOT ((TX FIFO EMPTY) OR (BLOCKED)) AND (OVER) AND (B FLAG = FALSE) | TRANSMIT A BUSY SYMBOL SET B FLAG = TRUE |
| 7 | NOT ((TX FIFO EMPTY) OR (BLOCKED)) AND (UNDER) AND (B FLAG = TRUE) | TRANSMIT A READY SYMBOL SET B FLAG = FALSE |
| 8 | (TX FIFO IS EMPTY) OR (BLOCKED) | NONE |
| 9 | (TX FIFO IS NOT EMPTY) AND (UNBLOCKED) | NONE |
| 10 | NOT ((TX FIFO IS NOT EMPTY) AND (UNBLOCKED)) AND (OVER) | TRANSMIT A BUSY SYMBOL |
| 11 | NOT ((TX FIFO IS NOT EMPTY) AND (UNBLOCKED)) AND (UNDER) | TRANSMIT A READY SYMBOL |

| HALF BYTE OR DATA NIBBLE | CODE WORD |
|---|---|
| 0 0 0 0 | 1 0 1 0 1 |
| 0 0 0 1 | 0 1 0 0 1 |
| 0 0 1 0 | 0 1 0 1 0 |
| 0 0 1 1 | 0 1 0 1 1 |
| 0 1 0 0 | 0 0 1 1 1 |
| 0 1 0 1 | 0 1 1 0 1 |
| 0 1 1 0 | 0 1 1 1 0 |
| 0 1 1 1 | 0 1 1 1 1 |
| 1 0 0 0 | 1 0 0 1 0 |
| 1 0 0 1 | 1 1 0 0 1 |
| 1 0 1 0 | 1 1 0 1 0 |
| 1 0 1 1 | 1 1 0 1 1 |
| 1 1 0 0 | 1 0 1 1 1 |
| 1 1 0 1 | 1 1 1 0 1 |
| 1 1 1 0 | 1 1 1 1 0 |
| 1 1 1 1 | 1 1 1 1 1 |

FIG. 9A

| CMD OR STATUS | ESC - CODE WORD | MEANING |
|---|---|---|
| 0 0 | — | DATA |
| 0 1 | 00010  10101 | READY |
| 1 0 | 00010  01001 | BUSY |
| 1 1 | | |
| FRAME CODES | | FRAME DELIMITERS |
| 1 0000  0000 | 00010  01010 | SDEL |
| 1 0000  0001 | 00010  11101 | EDEL |

FIG. 9B

PRESERVING DATA FRAME CONTINUITY ACROSS FULL-DUPLEX LAN INTERFACE WITH DISPARATE DATA CAPACITIES

This is a continuation of application Ser. No. 08/257,265 filed on Jun. 9, 1994 now abandoned.

BACKGROUND OF THE INVENTION

1. Field of the Invention

This invention relates to interfacing a node, including an end node such as a work station, with a LAN (Local Area Network) link in a communication network. More particularly, this invention relates to maintaining data frame continuity without extensive data buffering in an environment where data rate capability of a link is much higher than the data rate capability of a node attached to the link.

2. Description of Related Art

Figure 1:
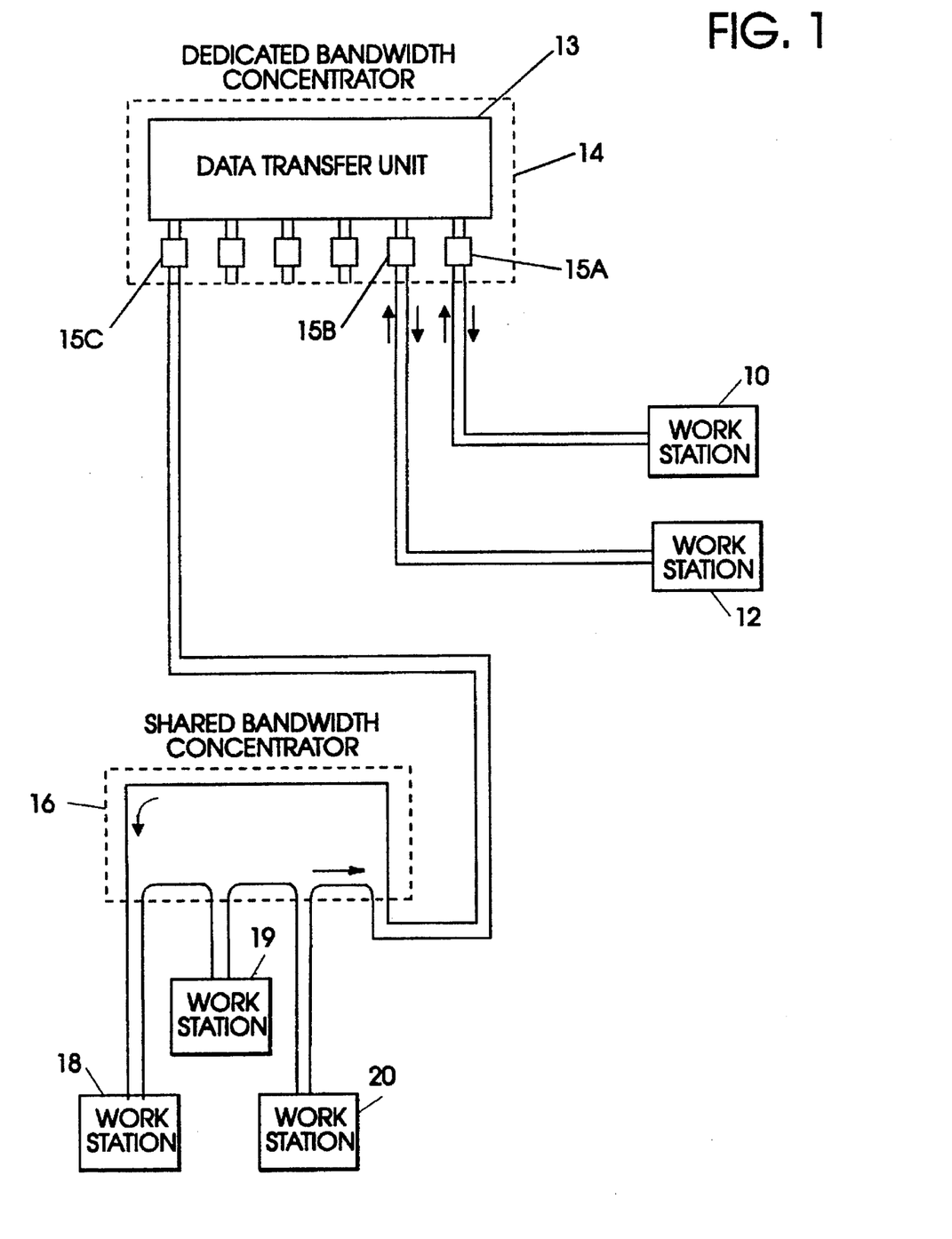
FIG. 1 illustrates a Local Area Network (LAN) containing various interconnections typical of the state of the data communication network technology.

One technique for increasing the data capacity a work station may use in a LAN is to decrease the number of stations that share the data capacity of that LAN. In FIG. 1, work stations 10 and 12, requiring very high capacity (for example, file servers) can be attached to a dedicated switch port in a dedicated capacity concentrator 14. Concentrator 14 contains a data transfer unit 13, such as a crossbar switch and ports 15. Ports 15 connect to communication links that, in turn, are connected to work stations or other LAN networks. Ports 15 would contain extensive buffering and communication media controls to implement the communication media protocol.

Ports 15A and 15B are connected as full duplex links to work stations 10 and 12, respectively. Port 15C is connected to shared capacity concentrator 16. Concentrator 16 has work stations 18, 19 and 20 connected to it in a ring network configuration. If the capacity of the ring network 16 is 100 Mbps (mega bits per second) and there are three work stations sharing the capacity of the ring, each station effectively has an average useable data rate of 33.3 Mbps. In contrast, each of the stations 10 and 12 has its own full duplex communication link, and uses, simultaneously, the entire 100 Mbps capacity in each direction of the full duplex link (effectively 200 Mbps capacity).

A Local Area Network with single full duplex 100 Mbps links between crossbar switches in the network is taught in an article by M. D. Schroeder et al, entitled "Autonet: A High-Speed, Self-Configuring Local Area Network Using Point-to-Point Links," published in *IEEE Journal On Selected Areas In Communications*, Vol. 9, No. 8, October 1991 (pp. 1318–1335).

Schroeder et al, in the above-cited article, recognize that in a network with high capacity data links, the data may back up through the network if a crossbar switch cannot keep up with the data rate. Autonet provides 4 kB (kilo byte) FIFO (First In First Out) buffers at the receiving switch ports in the crossbar switches and flow control for the links. The flow control between sending and receiving crossbar switch stations is accomplished by controls in the receiving switch station issuing start/stop signals to the sending switch station.

This problem of data backup on high-speed data links is greatly accentuated at the link interface to user work stations. Usually, a work station has an internal bus that has a much lower capacity than the data link. For example, a personal computer, as a work station, has an internal bus with a typical capacity of approximately 20 Mbps in contrast to a high-speed data link with a capacity of 100–200 Mbps.

In this situation, data frames must be buffered at the work station during both receive and transmit operations. Since data frames are lost if a buffer overflows or underflows, and since data frames are typically 4 kB (kilo Bytes) in length, large buffers, 64 kB to 256 kB, are required at the work station. In a communication network switching node, or in an end node (personal computer system or work station), this equates to having to add expensive memory chips on each communication adapter card.

SUMMARY OF THE INVENTION

It is an object of this invention to maintain data frame continuity between a high data capacity communication link, and a much lower data capacity node connected to the link, whether the node is a switching node or an end node.

It is a further object to provide the data frame continuity at the node-to-link interface without the use of large buffers to accommodate the disparity in data capacity, or other operative characteristics between the node and the link.

In accordance with this invention, the above objects are accomplished by using small FIFO buffers to buffer transmit and receive portions of a data frame, and by stretching and compressing the data frame, as necessary, to match available data to the FIFO buffers. The matching is accomplished by inserting and removing non-data symbols, or command code words, in the transmitted and received string of data words. Small FIFO buffers (much less than data frame in data capacity) operate on the fly with transmitter and receiver to transmit and receive data without requiring contiguous transmission of a complete frame. At the sending node, command code words are encoded inserted as non-data symbols in the frame to fill gaps between strings of data bytes. At the receiving node, the non-data symbols are stripped from the received data frame to separate command code words from data bytes. The command code words are used to communicate status between the transmitting node and the receiving node. Transmitted commands convey to a receiving node the status information of the transmitting node. The commands include Ready and Busy to indicate to the node at the opposite end of the link the status of the receive FIFO buffer in the node sending the commands. Commands, in addition to Ready and Busy, might be used to exchange additional control information between nodes at opposite ends of the link.

Other objects and features of the invention will be understood by those of ordinary skill in the art after referring to the complete written description of the preferred embodiments of the invention.

DESCRIPTION OF THE PREFERRED EMBODIMENTS

Figures 2, 3:
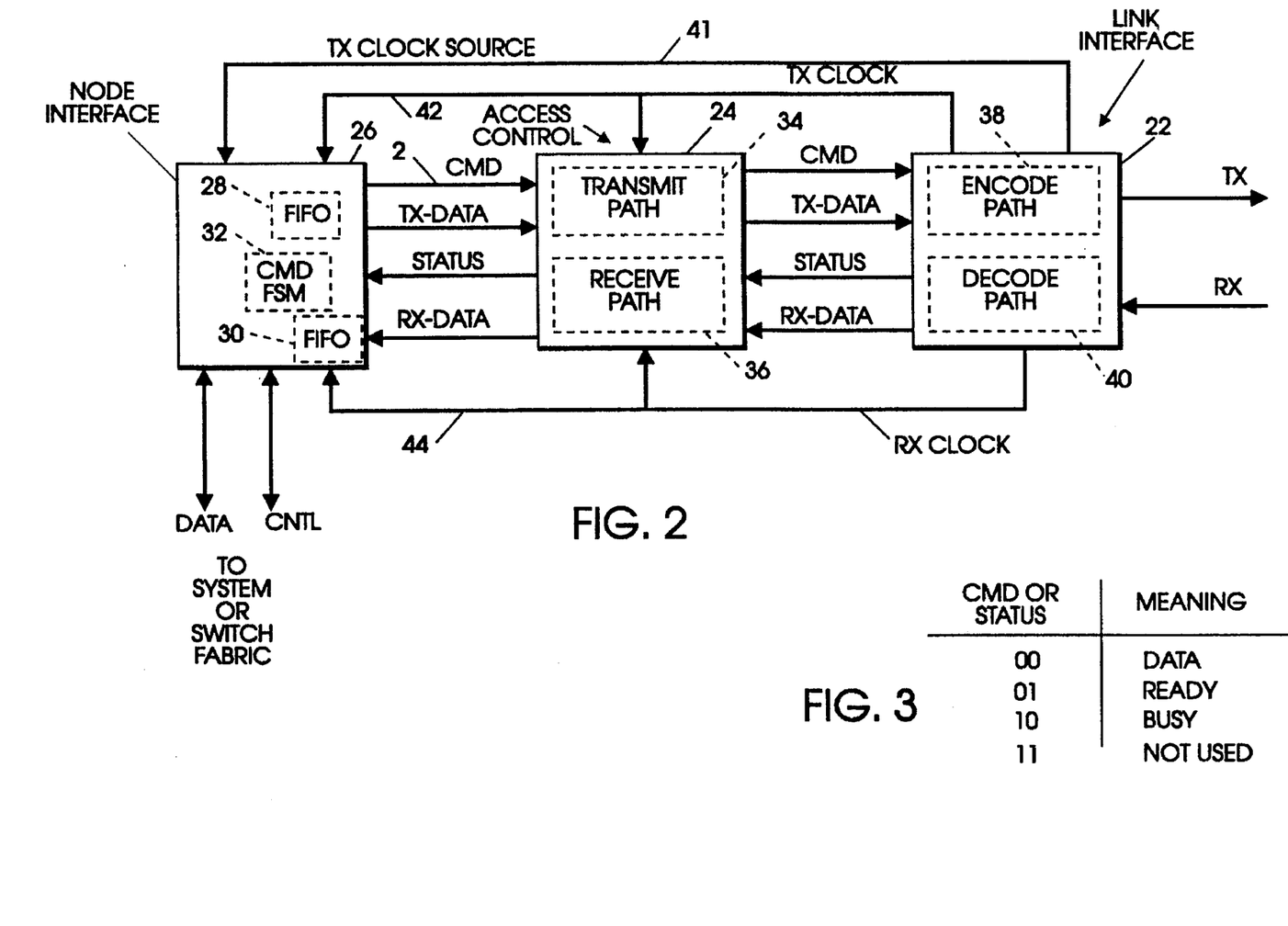
FIG. 2 shows an adapter for use in accomplishing the data frame continuity across the node/link interface in accordance with the invention.
FIG. 3 is a table of command/status codes used in the adapter of FIG. 2.

FIG. 2 illustrates the node/link interface adapter. The adapter is located at both a work station, or host computer, and at a concentrator in the network. It contains three basic functional elements; a link interface 22, an access control 24 and a node interface 26. If the adapter is at an end node, it has a computing system interface which interfaces with the data and control lines to a host computer or work station. For example, these lines would be the ISA bus in a personal computer, or a Microchannel bus in an PS/2 computer or an RS/6000 work station. In a personal computer, the adapter would usually be implemented as a communication adapter card. If the adapter is located at a network node, it has a switch port at a concentrator, and a switch fabric interface which interfaces to the data transfer unit, or switch fabric, of the concentrator.

Node interface 26 contains FIFO buffers 28 and 30 and command logic 31, including Ready/Busy Finite State Machine (FSM) 32. The FIFO buffers are used to accumulate a transmit portion of each frame for transmission to another node, or to accumulate a receive portion of each data frame for processing at the present node. Ready/Busy FSM 32 monitors the transmit (TX) FIFO buffer 28, and issues a Data command code indicating the TX FIFO buffer contains more than a minimum number of TX data words for transmission. In the preferred embodiment, the minimum number is zero; i.e., the TX FIFO is empty. Thus, the Data command code can be viewed as a minimum command code indicating whether or not the TX FIFO contains a minimum number of TX data words. If the Data command code or minimum command code indicates there are not a minimum number of TX data words in the TX FIFO, FSM 32 sends a non-data command code indicating the status of the RX FIFO buffer 30. FSM 32 monitors the receive (RX) FIFO buffer 30 and status codes (usually command codes from another adapter), and issues command codes for transmission during non-data transmission intervals.

The FIFO buffers are small, less than 20% of a data frame. The size of the TX buffer 28 is a function of data transfer efficiency on the system bus. Typically, a size of about 100-bytes is needed for an efficient usage of a system bus. Anything less and the bus arbitration overhead time relative to data transfer time can be unacceptably high. The size of the RX FIFO buffer 30 is also a function of system bus data transfer efficiency, and this criteria for the RX FIFO size will usually determine the size. However, the RX FIFO should also not be any smaller than twice the number of bits that can be in transit on a receive link, plus the time for the adapter at the opposite node to turn-around a Busy status condition into a Ready status condition. For example, for a 100 Mbps receive link and 100 meters long, this is about 12-bytes, plus two bytes to allow for turnaround time. The node interface will be described in more detail in reference to FIG. 4.

In FIG. 2, the transmit path 34 of access control 24 contains frame check sequence generation logic for inserting data check codes in the transmitted data frame. In receive path 36, the access control includes address matching and frame check sequence checking. A transmitting node inserts the frame check sequence, and a receiving node checks the sequence. If the sequence does not check at the receiving node, a status code is set for the bad data frame. The address matching in the receive path simply identifies those frames to be processed by the node. If there is an address mismatch, the frame is blocked from the node interface 26. Access control 24 is shown in detail in FIGS. 7A and 7B which are described hereinafter.

Link interface 22 includes the encoding/decoding logic, as well as the line driver and receiver. The encode path 38 inserts non-data symbols encoded from non-data command code words from FSM 32 to fill gaps in the transmitted frame when the data processed from the system is running behind the data on the link. In effect, the transmitted data frame is stretched. The decode path 40 separates, or strips, the data from non-data symbols upon receipt. The non-data symbols are decoded into non-data command (status) code words upon receipt. Thus, the effect of the decode path is to compress the stretched frame that was transmitted back to true data frame size for data processing at the node. In this way, the data frame continuity may be maintained across the node/interface links, despite mismatches between data capacity of the node and the link. Link interface 22 is described in detail hereinafter with reference to FIG. 8.

The buses or connections between node interface 26, access control 24 and link interface 22 carry either 2-bits or 9-bits in parallel. In FIG. 2, the numerals 2 or 9 beside lines connecting functional elements indicate the number of parallel bits being carried by the bus. The data and control bus out of the node interface 26 to the system or switch fabric carry parallel bits, but the number of parallel bits depends on the size of the bus. Line 41 carries the Transmit (TX) Clock source signal generated at the encode path in link interface 22. Line 42 carries the TX Clock signal line; TX Clock is a gated TX Clock source signal also generated at the encode path 38 in link interface 22. Line 44 carries the Receive (RX) Clock. The RX Clock is recovered from the received data. The TX Clock and RX Clock signals are used in clocking the data through the adapter. TX Clock and RX Clock are not used with the processing of command/status codes.

The table in FIG. 3 illustrates the command/status codes used in the preferred embodiment of the invention. As shown in Table 3, the codes are identical whether they are commands or status. Command indicates the code is a transmitted code; status indicates the code is a received code.

Figure 4:
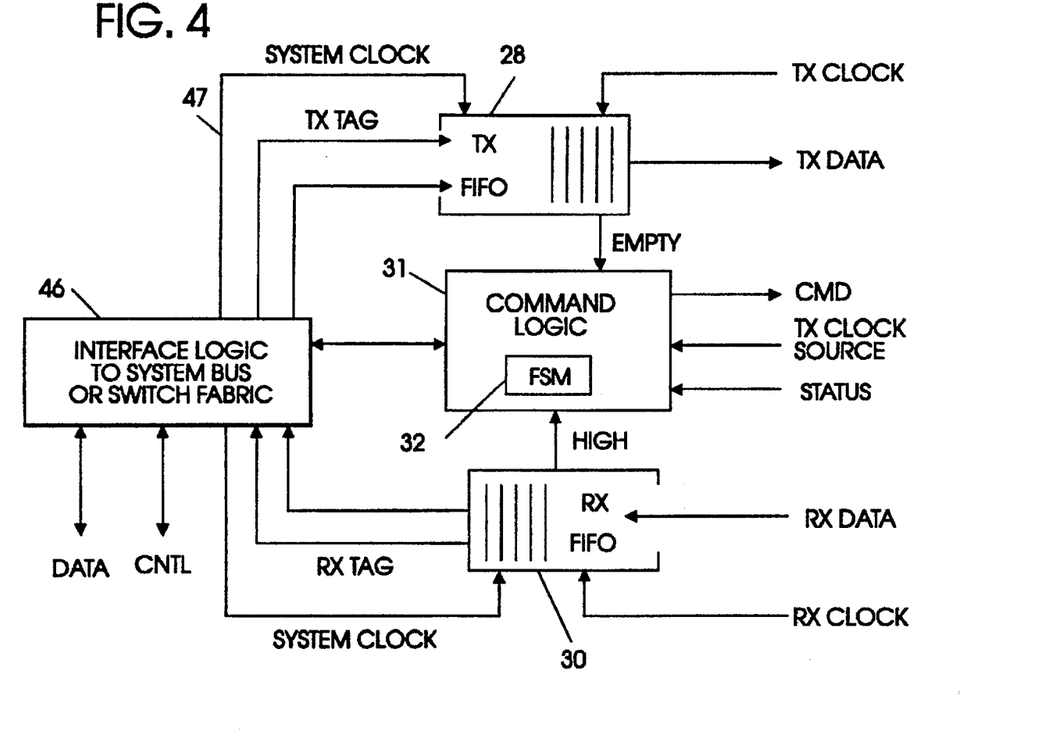
FIG. 4 shows the details of the node interface 26 in FIG. 2.

In FIG. 4, the node interface comprises TX FIFO buffer 28, RX FIFO buffer 30, command logic 31, including Ready/Busy Finite State Machine (FSM) 32, and interface logic 46. Interface logic 46 simply interconnects the data and control bits at the node to the buffers 28 and 30 and the command logic 31. Command logic 31, including Ready/Busy FSM 32, may be implemented as a programmed microprocessor or as hardwired logic. Usually, hardwired logic is preferred because of its speed of operation.

Eight-bit bytes (octets) of data, plus a tag bit are loaded into TX FIFO 28 for transmission. In the nodes, network or end, the data frames are built in accordance with the following convention:

0 XXXX XXXX=data octet plus "0" tag bit;
1 0000 0000=start of data frame;
1 0000 0001=end of data frame; and
1 0000 1111=end of bad data frame.

In other words, if the tag bit is a zero, the octet is data. If the tag bit is one, the octet is non-data, and the non-data bits will indicate whether the octet is a start of frame or end of frame. The 9-bit code for end of bad frame 1 0000 1111 is generated at the receive path 36 in access control 24, and the generation will be described in more detail later herein.

The octet with the TX tag bit is clocked into the TX FIFO as a 9-bit word with the system, or node, clock on line 47. The 9-bit words in the FIFO are clocked out to the access control 24 (FIG. 2) with the TX Clock signal from the encode path at the link interface 22 (FIG. 2).

In the case where the node is an end node, the TX data 9-bit words rapidly flow out buffer 28 onto the link when TX buffer 28 has data to send, and transmission of data on the link is not blocked. During data transmission, the 9-bits flow out of TX FIFO 28 far faster than the system at the end node can load bytes into the TX FIFO buffer. This may also be true of a switch fabric, but usually the switch fabric is fast enough to keep better pace with link. When TX FIFO 28 goes to an empty, or minimum condition, this condition is sensed by FSM 32, which then generates a command code that is passed through access control 24 (FIG. 2) to link interface 22 (FIG. 2). The command code that is sent depends upon the state of the FSM, which largely depends upon the filled condition of the RX FIFO 30 and the status code last received from the node at the opposite end of the link. The FSM states, input conditions and actions are described hereinafter with reference to FIG. 6.

Asynchronous with TX data flowing from TX FIFO 28, RX data is clocked into the RX FIFO buffer 30 by the RX clock signal. The RX data 8-bit octets (i.e., without the tag bit) are passed onto the system bus or the switch fabric when clocked out of the RX FIFO by the system, or switch fabric, clock. Ready/Busy FSM 32 monitors the RX FIFO buffer's data filled state for a High condition. A High condition indicates the buffer is filled above a predetermined threshold; i.e., more than ⅔ full. The setting of the High threshold for RX FIFO 30 depends on the following criteria. When the HIGH threshold is reached by RX data words filling the RX FIFO, there must be at least enough FIFO space left in the buffer to accommodate twice the number of bits that can be in transit on the receive link, plus the time for the adapter at the opposite end of the link to turn around a Busy condition to a Ready condition. In the preferred embodiment, FSM 32 will generate a Ready command code when FIFO is less than ⅔ full, and a Busy command when the buffer is at least ⅔ full.

The command logic 31, including Ready/Busy FSM 32, is clocked from the TX Clock source rather than TX Clock. This is due to TX Clock being a gated signal that is only present when the link interface is encoding and transmitting TX data. Command/status codes must be processed in real time. Therefore, logic 31 and FSM 32 are continuously clocked by the TX Clock source. The sampling of inputs or conditions and the FSM transitions are based on the TX Clock source leading edge.

Figure 5A:
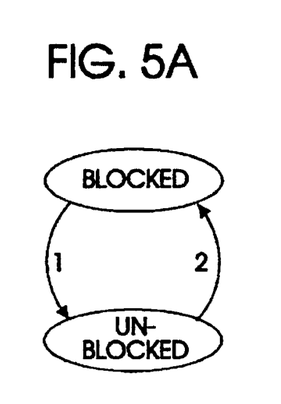
FIGS. 5A, 5B AND 5C are state/transition diagrams of the Ready/Busy Finite State Machine (FSM) in command logic 32 in FIG. 4.
Figure 5B:
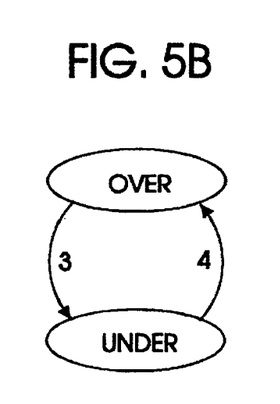
Figure 5C:
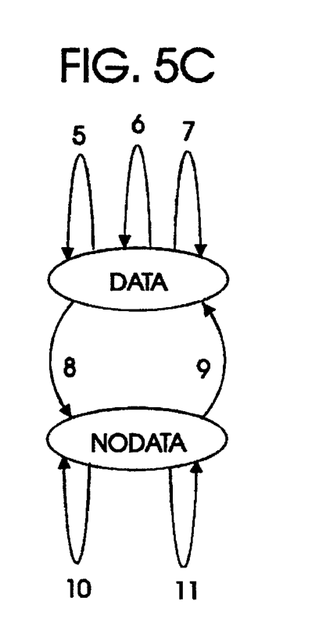

The operation of the Ready/Busy FSM is shown by the state diagrams in FIGS. 5A, 5B and 5C. The states in FIGS. 5A and 5B are conditions for transitions between DATA and NODATA states in FIG. 5C. In FIG. 5A, BLOCKED state refers to the node at the opposite end of the link being blocked; i.e., unable to receive data. The reason why the opposite node would be blocked is that its RX FIFO buffer is over its High threshold.

UNBLOCKED state refers to the node at the opposite end of the link being unblocked; i.e., able to receive data. In FIG. 5B, OVER state indicates the RX FIFO 30 in the present node is filled with data bytes past the High threshold. UNDER state indicates data bytes in the RX FIFO buffer in the present node are only in storage space below the High threshold.

Figure 6:
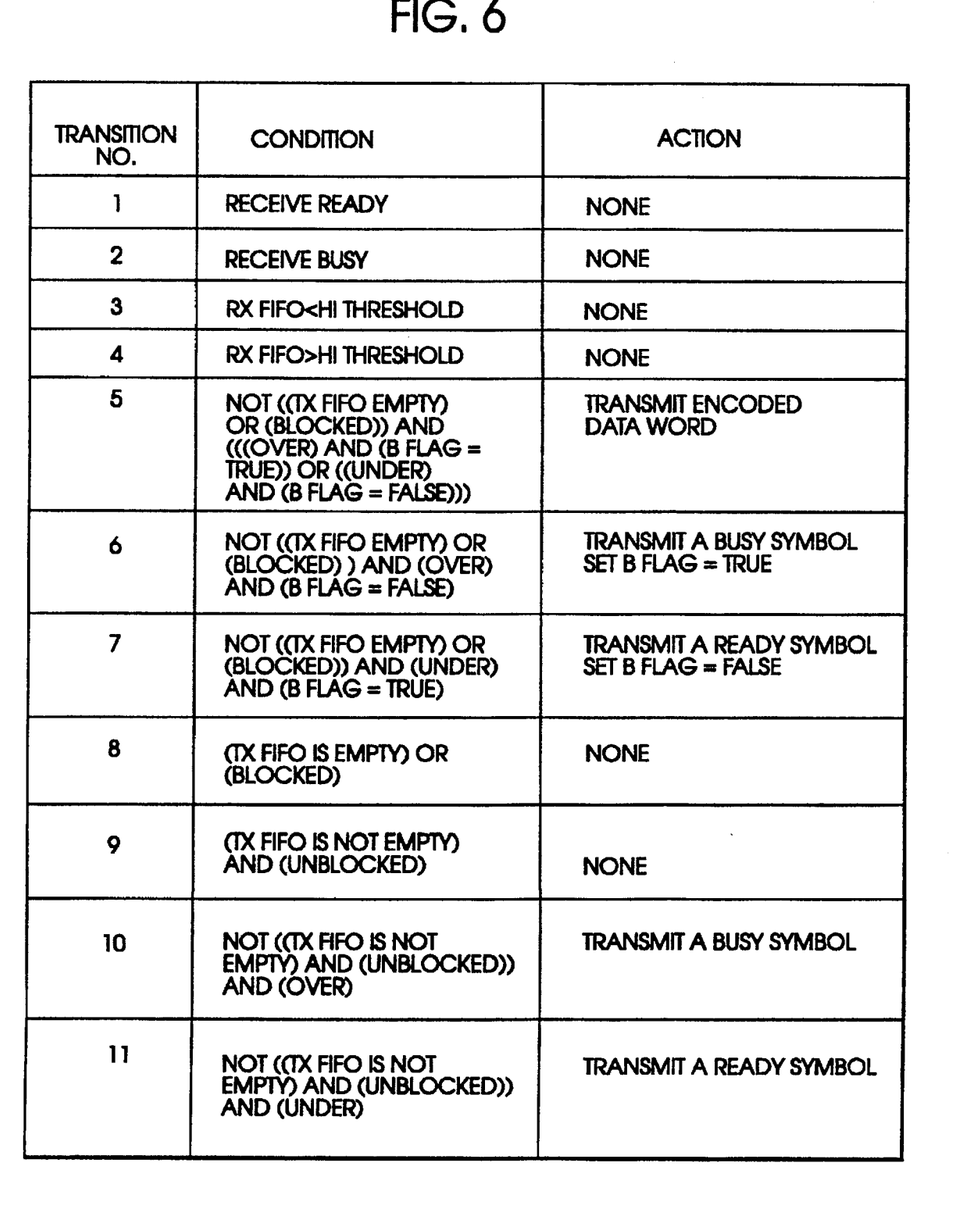
FIG. 6 is a table of transitions, conditions and actions for the Ready/Busy FSM in FIGS. 5A, 5B and 5C.

The transitions between states in FSM 32 are shown in FIG. 6. In FIG. 5A, if FSM 32 is in BLOCKED state and receives a Ready code, 01, from the opposite node, the FSM transitions (transition 1) to UNBLOCKED state and takes no action. If the FSM is in an UNBLOCKED state and receives a Busy code, 10, from the opposite node, the FSM transitions (2) to the BLOCKED state and takes no action.

In FIG. 5B, if FSM 32 is in an OVER state and data in the RX FIFO 30 in the present node is below the High threshold, the FSM transitions (3) to the UNDER state and takes no action. This UNDER state indicates the RX FIFO buffer 30 is not too full. If the FSM is in the UNDER state and data in the RX FIFO in the present node fills the buffer above the High threshold, the FSM transitions (4) to the OVER state and takes no action. The OVER state indicates the RX FIFO buffer is too full.

In FIG. 5C, FSM 32 transitions between DATA and NODATA states, or transitions within the same state. In transition (5), the FSM is in the DATA state and the input conditions are: Not{(TX FIFO=EMPTY) OR BLOCKED} AND {(OVER AND (B-FLAG=true)) OR (UNDER AND (B-FLAG=false))}. B-FLAG is an internal flag for the FSM 32. It is set true when a Busy code has been sent to the opposite node. B-FLAG is set false when a Ready code has been sent to the opposite node. With these input conditions, the FSM emits the Data code, 00, and returns, or stays, in the DATA state. In effect, the TX FIFO buffer is not empty, the opposite node is not blocked, and a Busy or Ready code does not need to be sent.

In transition (6), the FSM is in the DATA state and the input conditions are: Not{(TX FIFO=EMPTY) OR BLOCKED} AND OVER AND (B-FLAG=false). Under these conditions, the FSM stays in the DATA state and acts to transmit a Busy code, 10 and sets the B-FLAG=true. In effect, the TX FIFO buffer is not empty, the opposite node is not blocked, and a Busy code, 10, is to be sent at the next opportunity (after the octet presently being transmitted) because the RX FIFO has an over threshold condition.

In transition (7), FSM 32 is in the DATA state, and the input conditions are: Not{(TX FIFO=EMPTY) OR BLOCKED} AND UNDER AND (B-FLAG is true). Under these conditions, the FSM stays in the DATA state and acts to transmit a Ready code, 01, and sets the B-FLAG=false. In effect, the TX FIFO buffer is not empty, the opposite node is not blocked, and a Ready code is to be sent at the next opportunity because the RX FIFO has an under threshold condition.

In transition (8), FSM 32 is in the DATA state, and the input conditions are: (TX FIFO is empty) OR BLOCKED. The FSM takes no action, but does transition to the NODATA state. Because the TX FIFO buffer has gone empty or the opposite node is blocked, the FSM is now in a state where no data is being sent from the present node.

In transition (9), FSM 32 is in the NODATA state, and the input conditions are: (TX FIFO is not empty) AND UNBLOCKED. The FSM takes no action, but does transition to the DATA state. The TX FIFO now contains data to be sent, and the opposite node is not blocked so the FSM transitions to a state where data will be sent.

In transition (10), FSM 32 is in the NODATA state, and the input conditions are NOT{(TX FIFO is not empty) AND UNBLOCKED} AND OVER. The FSM stays in the NODATA state and acts to transmit a Busy code, 10. In effect, the FSM acts to send a Busy code to the opposite node at the next opportunity because the RX FIFO is in an over threshold condition.

In transition (11), FSM 32 is in the NODATA state, and the input conditions are: NOT{(TX FIFO is not empty) AND UNBLOCKED} AND UNDER. The FSM stays in the NODATA state and generates a Ready code, 01. In effect, the FSM acts to send a Ready code to the opposite node at the next opportunity because the RX FIFO is in an under threshold condition.

Figure 7A:
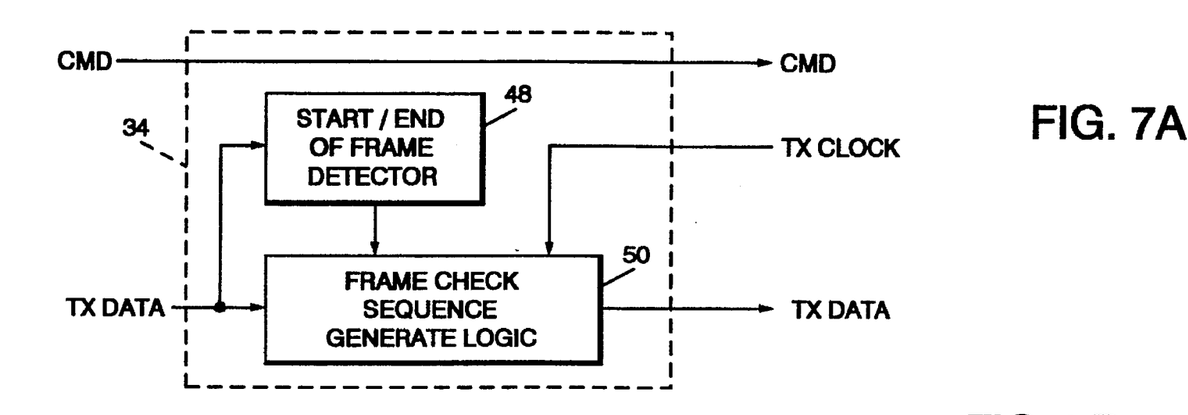
FIG. 7A shows the implementation of the transmit path 34 in FIG. 2.

During transmission, the data bytes and the command codes from the node interface shown in FIG. 4 go to the transmit path 34 (FIG. 2), which is shown in detail in FIG. 7A. In FIG. 7A, the command code is passed straight through to the link interface in FIG. 8. The 9-bit TX data word is received by the start/end of frame detect 48 and the frame check sequence. Detector 48 is looking for the frame-start word 1 0000 0000, and the frame-end word 1 0000 0001. When the frame-start word is detected, detector 48 enables the Frame Check Sequence (FCS) generate logic 50. FCS logic 50 receives octets with a "0" tag bit as they are clocked out of the TX FIFO buffer by TX Clock, passes the octets and tag bit to the link interface in FIG. 8, and adds the Frame Check Sequence at the end of the data frame. Detector 48 detects the end of the frame when it detects frame-end word 1 0000 0001.

Figure 8:
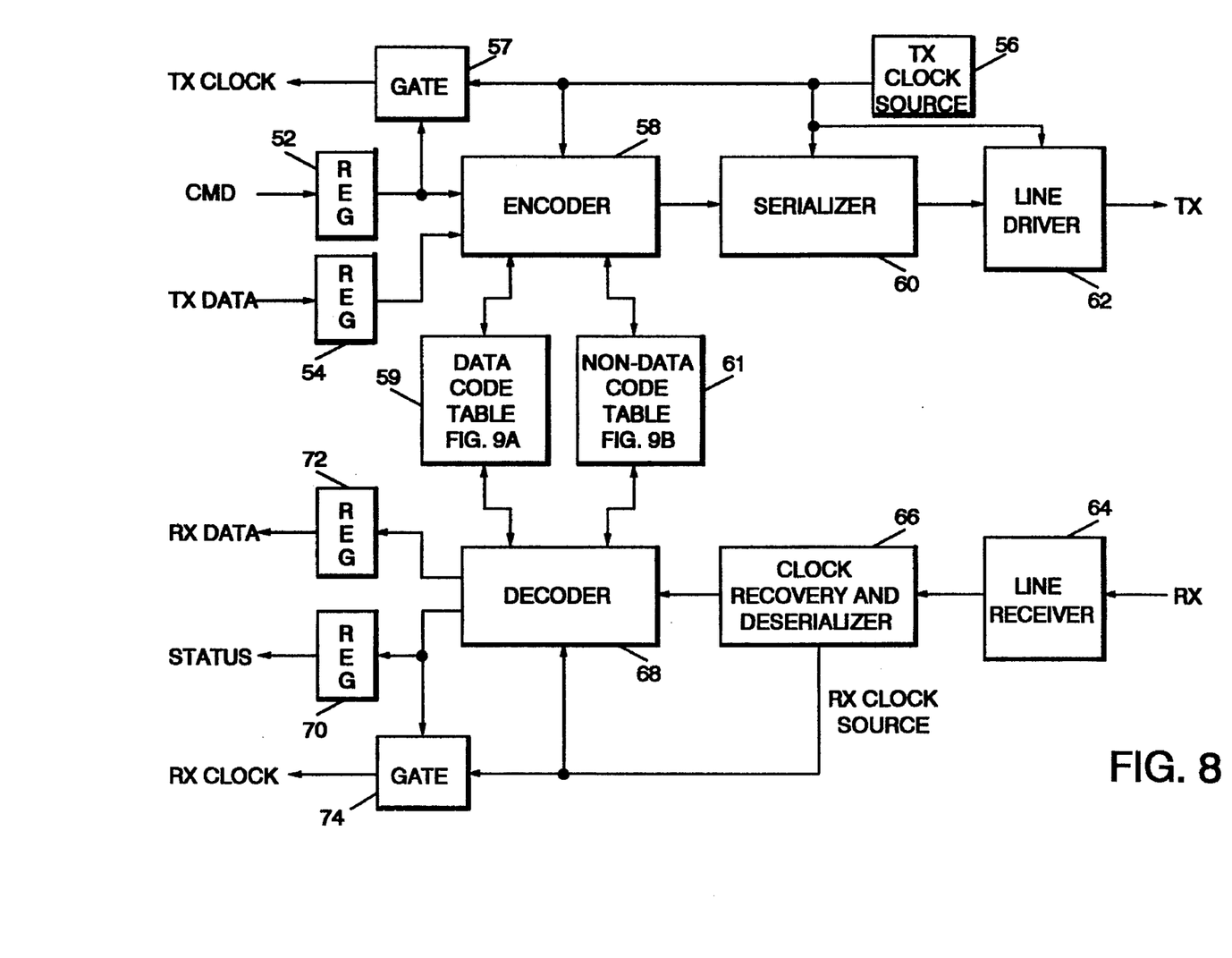
FIG. 8 illustrates the implementation of the link interface 22 in FIG. 2.

In FIG. 8, the command code is received at register 52, and the TX data words are received at register 54. TX Clock from TX Clock source 56 controls the clocking of data bytes from the FCS generate logic 50 in FIG. 7A to register 54 in FIG. 8. If the command received at register 52 is other than the Data code, 00, gate 57 is inhibited. Thus, TX Clock is only passed to the access control 24 (FIG. 2) and the node interface 26 (FIG. 2) when a data code from FSM 32 (FIG. 4) enables gate 57 via register 52.

Figure 9A:
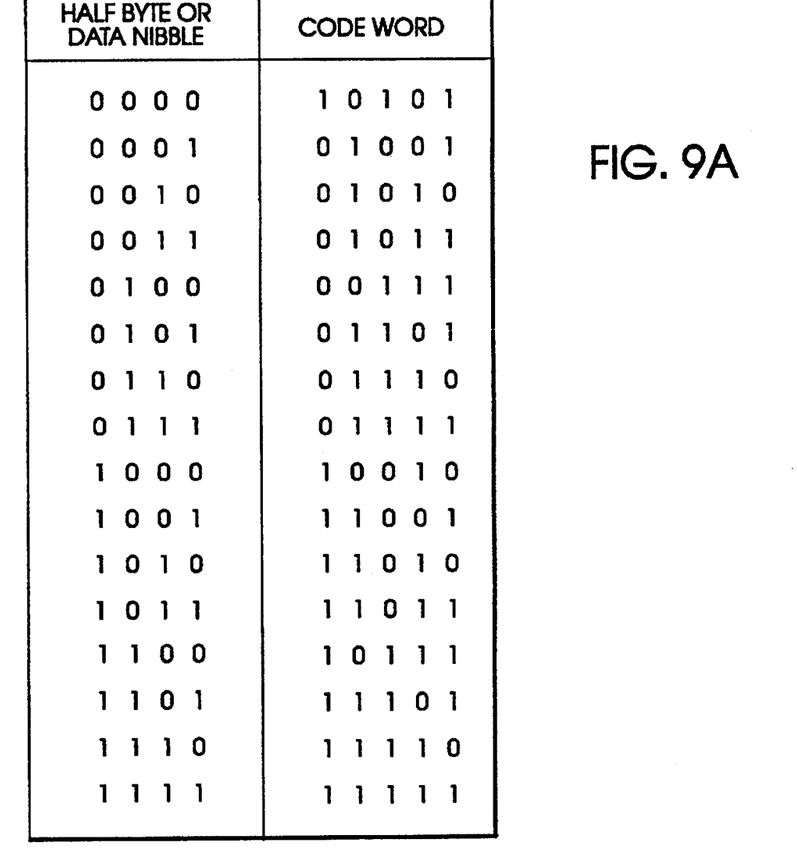
FIGS. 9A and 9B correspond to code conversion tables 59 and 61 in FIG. 8.
Figure 9B:
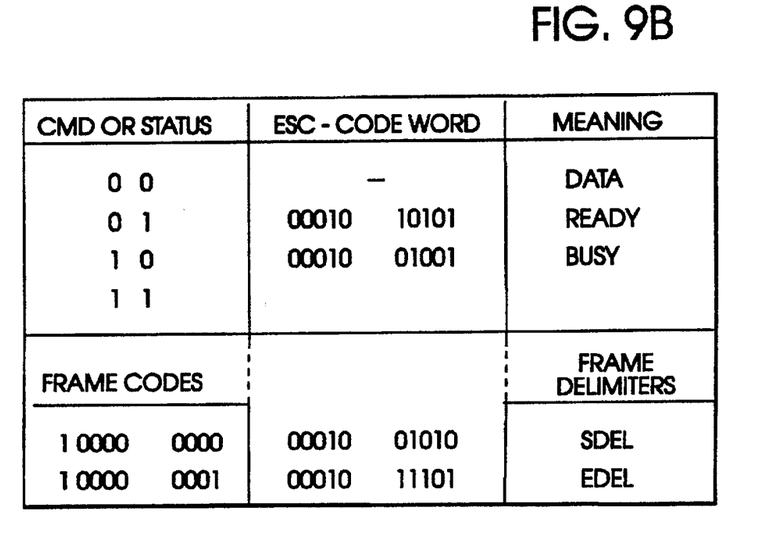

Encoder 58 in FIG. 8 encodes the command codes and the data bytes, or octets, into a 4/5 code for transmission. FIGS. 9A and 9B illustrate the contents of the data code table 59, and the non-data code table 61. These tables are used by encoder 58 to make the 4/5 code conversion. Each half octet, or data nibble, of each data octet is converted to a 5-bit code per the table in FIG. 9A. Notice that the tag bit 0 with each data octet is not encoded. A data octet is thus converted to a 10-bit word for transmission.

The Ready command code, 01, and the Busy command code, 10, which are non-data command codes, are converted to a 10-bit code by encoder 58 using conversion table 61. The 5-bit code for an escape character is added to each 5-bit code word to make up the 10-bit word to be transmitted for the Ready and Busy commands.

Encoder 58 also uses table 61 to encode Start Delimiter SDEL and End Delimiter EDEL for the data frame sent out on the link by line driver 62. The start of frame 9-bit code 1 0000 0000 is converter to the 10-bit SDEL 00010 01010. The end of frame 9-bit code word is converted to the 10-bit EDEL 00010 11101. The first five bits is the Escape (ESC) code word 00010. The ESC code has the unique property of being recognizable anywhere in a bit stream. Therefore, it is useful in delineating the Ready and Busy commands in the data stream. Also, since all frames start with SDEL which contains the ESC code, it is useful in establishing alignment for detecting octets.

In addition to the code conversion, an important function of encoder 58 is the encoding of Ready/Busy non-data command codes from FSM 32 into non-data symbols, and the insertion of these symbols in the transmission data stream. When the command is Data command code, 00, and the TX tag is 0, TX data octets from register 54 are encode by encoder 58 using table 59, and sent out on the link. When a Busy or Ready command is in register 52, encoder 58 finishes encoding the current data octet, and then encodes that Ready or Busy command using table 61. The Ready or Busy symbol is sent out repeatedly until the Data command code 00 is again loaded into register 52. Thus, if the command was Ready, encoder 58 would stop sending data, and would send Ready symbols with an escape code for each 10-bit transmitted word. Similarly, a string of Busy symbols would be transmitted if the command in register 52 was Busy. In effect, encoder 58 will be sending a data frame, consisting of a string of data bytes (encoded as 10-bit words), with a string of Ready or Busy non-data symbols (encoded as 10-bit words) interspersed between data strings.

From encoder 58, the 10-bit TX word is serialized by serializer 60, and sent out on the link by line driver 62. TX Clock source 56 provides the timing for the serialization of the words and the transmission of the bits.

Since the link is duplex, the node is also duplex in that the RX words must be processed while TX words are being transmitted. Accordingly, line receiver 64 receives RX bits from the line driver at the opposite node on the link. The RX data stream is converted to 10-bit RX words by deserializer 66. The deserializer also recovers the clock signal from the RX bits, and generates the RX Clock source signal used by the adapter in processing RX data and status codes.

Decoder 68 performs the inverse role of encoder 58. When decoder 68 does not detect an ESC code, the decoder uses data code table 59 to convert the 10-bit word back to a data byte or octet, plus a tag bit. When Decoder 68 detects an ESC code, it decodes the non-data symbol as the Ready or Busy status code words, or it decodes the SDEL and EDEL code words using table 61. In effect, the decoder separates or strips non-data symbols from the RX data stream; the RX data octets with a 0 tag bit go to register 70, and the status codes go to register 72. The SDEL and EDEL are converted to Frame-start 9-bit codeword 1 0000 0000 and Frame-end 9-bit codeword 1 0000 0001; these frame codes also go to register 72 as 9-bit RX data words. In addition, when decoder 68 detects the presence of data, it generates the Data command code, 00.

Also, decoder 68 controls the RX Clock gate 74. Gate 74 is only enabled if data is being received and decoder 68 generates the Data status code, 00. When the status is other than Data (i.e., Ready or Busy command codes are being received), gate 74 is inhibited, and the RX Clock is blocked from the access control 24 (FIG. 2) and the node interface 26 (FIG. 2).

Figure 7B:
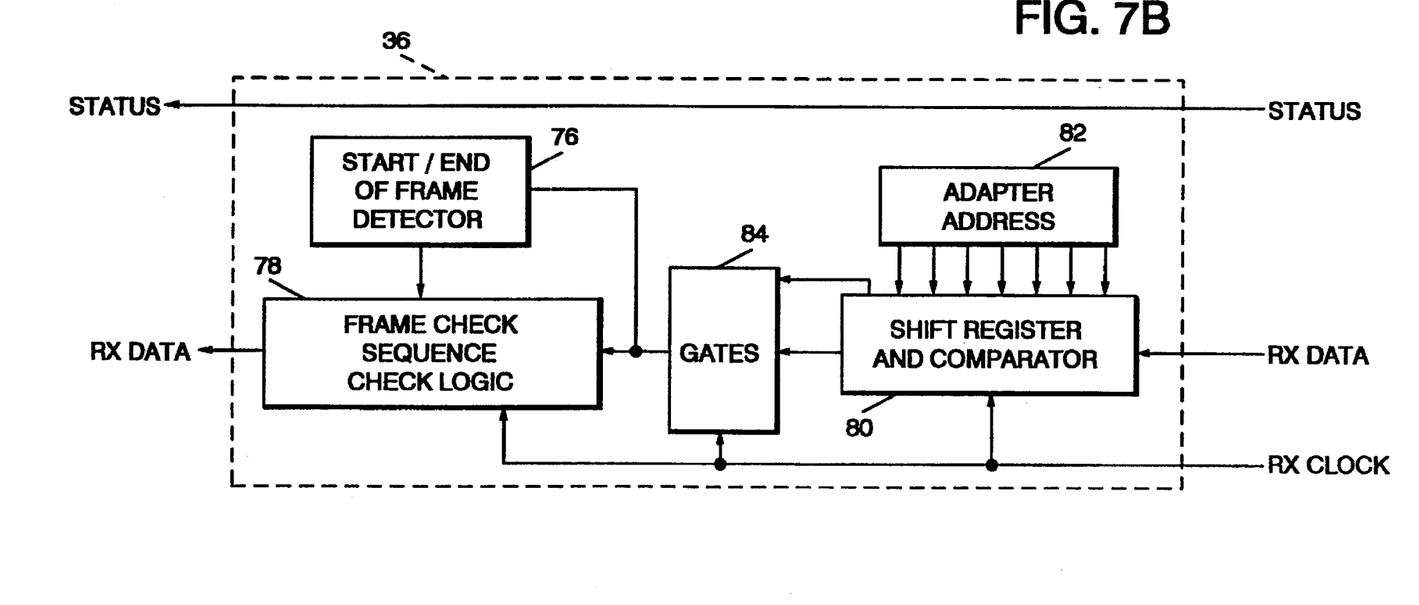
FIG. 7B shows the implementation of the receive path 36 in FIG. 2.

The receive path 36 of the access control is shown in FIG. 7B. In the receive path, the status code is passed through to command logic 31 (FIG. 4). The RX data bytes are loaded into shift register and comparator 80 from register 72 (FIG. 8) by the RX Clock. Comparator 80 is looking for the adapter address in the data frame by comparing the address in the received data frame to the node address in register 82. If the node is an end node, the adapter will usually have a predefined adapter card address in register 82. Otherwise, the node address may be loaded by system control software, or by network control software. The 9-bit line from the adapter address will contain the Frame-start codeword 1 0000 0000. The remaining six 8-bit lines from the adapter address are address codes; thus, the adapter address may be up to 6 bytes long following the start of frame codeword. If there is an address match between the received data frame and the node address in register 82, gates 84 are enabled by comparator 80. The RX data octet, plus tag bit, are passed to the start/end of frame detector 76, and the Frame Check Sequence (FCS) check logic 78. If there is no address match, gates 84 are inhibited and the RX data dumps out the end of shift register/comparator 80.

Start/end of frame detector 76 enables FCS checking logic 78 when the start of frame codeword is received. After frame check logic 78, the octets plus tag bit go to the RX FIFO buffer 30 at the node interface. When detector 76 detects the end of frame codeword 1 0000 0001, the FCS check logic performs the frame check operation. If the frame check is not successful, the existing EDEL, 1 0000 0001, is replaced by a bad end of frame codeword, 1 0000 1111, from check logic 78 to RX FIFO 30 (FIG. 4).

To illustrate the operation and advantages of the invention, some typical transmit and receive operations will now be described. In this exemplary operation, it is assumed that the present node being described is an end node; i.e., a work station computing system, and the node at the opposite end of the link is a network node containing a data transfer unit or switch fabric. When the system bus in the work station gets access to the adapter, it loads a small portion of the data frame into the TX FIFO buffer 28. A data frame would typically contain 2048 or 4096 bytes. The TX FIFO buffer is 200 bytes in the preferred embodiment; thus, the FIFO buffer 28 can hold something less than 10% of the total data frame. In this example, the work station might load 50 to 100 bytes, or octets, plus tag bits into TX FIFO buffer 28.

When the adapter initiates transmission of a data frame over the link, the TX buffer is quickly emptied as the data bytes quickly pass through the FCS generate logic 50, the encoder 58, serializer 60 and line driver 62, and onto the link. When the TX buffer reaches empty, FSM 32 will generate a Ready command or a Busy command, depending on the OVER or UNDER condition of the RX FIFO buffer 30. Encoder 58 then inserts Ready or Busy non-data symbols in the transmitted data frame, or between data frames, while there are no data bytes.

If, while the adapter is transmitting a data frame over the link and while the TX FIFO buffer is being emptied, FSM 32 detects a change in condition at the RX FIFO buffer 30, FSM 32 interrupts the data flow from the TX FIFO buffer by putting out a Ready or Busy command. Encoder 58, after finishing encoding the current data octet, then inserts the Ready or Busy symbol in the TX bit stream being sent out on the link. In effect, the transmission of the Ready or Busy information to the opposite node takes priority over sending data. However, once the Ready or Busy symbol has been sent, the FSM returns to issuing the Data command, and thus the adapter returns to sending data octets from TX FIFO 28 onto the link.

On the reception side of the adapter, RX data stream is constantly being received from the link. Decoder 68 separates the RX 9-bit words into status codes, and RX data words with start and end of frame code words. Only RX data octets, including SDEL and EDEL, are passed to shift register/comparator 80. If the RX data octets are in a data frame addressed to this work station, the data bytes with tag bit are gated through FCS check logic 78, and into RX FIFO 30. When the system bus or switch fabric gets access to the adapter, it reads the data bytes from RX FIFO 30.

Received status code words are passed to FSM 32, irrespective of the address of the data frame. The reason for always processing the status codes at the FSM is that the status codes give the condition of the node at the opposite end of the link. This information is needed by the present node to determine whether or not the opposite node is blocked or unblocked.

The RX FIFO buffer has a 200-byte capacity in the preferred embodiment. Just like the TX FIFO buffer, the RX FIFO buffer can accommodate only about 10% of a typical data frame. Because the transmitted frame on the link has small portions of the data frame interspersed with strings of Ready or Busy code words, the data flow into the RX FIFO, after the Ready or Busy code words are removed, will more closely match the capacity of the system bus to empty the RX FIFO. In other words, the actual data frame in the work station system is stretched during transmission so there are no gaps in the frame on the communication link. Upon receipt, the adapter shrinks or compresses the stretched data frame back to actual data frame size. Most important, since there were no gaps in the frame during transmission, the data frame is detected as a good, complete frame as long as the FCS check logic does not detect an error.

While a number of preferred embodiments of the invention have been shown and described, it will be appreciated by one skilled in the art, that a number of further variations or modifications may be made without departing from the spirit and scope of our invention.

What is claimed is:

1. In a communication network having nodes and communication links that do not have matched data capacity and duplex transmission between a first node at one end of a communication link and a second node at the opposite end of the communication link, a method at the first node for preserving the continuity of a first node data frame transmitted from the first node to the second node and for passing status information back from the first node to the second node, the status information indicating the status of buffering data strings at the first node, the data strings being a part of a second node data frame being transmitted to the first node from the second node, said method at the first node comprising the steps of:

(a) if data capacity of the link is greater than data buffering capacity of the first node, detecting where gaps will occur between data strings in the first node data frame to be transmitted from the first node to the second node;

(b) stretching the first node data frame by inserting first node status information in the gaps before the first node data frame is transmitted so that the first node data frame is continuous and becomes a stretched data frame;

(c) transmitting the stretched data frame;

(d) receiving at the first node the second node data frame transmitted from the second node;

(e) buffering at the first node the second node data frame received by step (d);

(f) detecting from step (e) the data filled state of a buffer buffering the second node data frame at the first node and providing status information indicating the data filled state of the buffer buffering the second node data frame at the first node; and step (b) responsive to step (f) for inserting the first node status information into the gaps whereby data frame continuity is maintained and first node status information is passed back to the second node.

2. The method of claim 1 wherein the second node data frame includes second node status information between data strings in a stretched second data frame being transmitted by the second node to the first node and in addition the steps of:

(g) detecting a blocked condition at the second node from the second node status information;

(h) in response to the blocked condition, interrupting data flow of the first node data frame through the first node to create gaps between data strings in the first node data frame being transmitted; and said stretching step (b) inserts first node status information in the gaps and maintains data frame transmission continuity.

3. The method of claim 2 and wherein the first node status information inserted by said stretching step indicates the first node is ready to receive the data strings of the second node data frame or is busy and cannot receive the data strings of the second node data frame.

4. Adapter apparatus in a communication node for maintaining continuity of a data frame between a communication link and a communication node where a data frame is transported at a first data rate at the node and is transmitted at a second data rate on the link, said apparatus including:

transmit buffer means having a data capacity less than the data capacity of the data frame, for buffering a transmit portion of the data from the data frame as data is being transported at the first data rate at the node and for providing said transmit portion for transmission on the link at the second data rate, greater than the first data rate;

means for detecting when said transmit buffer means is buffering a minimum size transmit portion; and     means responsive to said detecting means for inserting non-data symbols between transmit portions of the data frame being transmitted on the link when the transmit portion buffer by said transmit buffer means is at the minimum size, said inserting means repeating the symbols as necessary to maintain a continuous bit stream between said transmit portions in the data frame.

5. The apparatus of claim 4 wherein the minimum size is zero and said detecting means indicates an empty or not empty condition for said transmit buffer and wherein said inserting means further comprises:

first means responsive to the not empty condition for generating a data command indicating transmit portions of the data frame are available for transmission;

second means responsive the empty condition for generating a non-data command;

means responsive to the data command and said transmit buffer means for sending transmit portions from the node onto the link; and     means responsive to the non-data command for continuously sending non-data symbols onto the link to maintain a continuous bit stream between said transmit portions.

6. The apparatus of claim 4 wherein the communication link is a full duplex link and the communication node is a full duplex node, and said apparatus further comprises:

receive buffer means for buffering a receive portion of the data frame as data is received from the link and providing said receive portion of the data for processing by the node; and     means for separating non-data symbols and portions of a data frame received from the link and providing said portions as the receive portions to said receive buffer means.

7. The apparatus of claim 6 wherein the minimum size is zero and said detecting means indicates an empty or not empty condition for said transmit buffer and wherein said inserting means further comprises:

first means responsive to the not empty condition for generating a data command indicating transmit portions of the data frame are available for transmission;

second means responsive to the empty condition for generating a non-data command;

means responsive to the data command and said transmit buffer means for sending transmit portions from the node onto the link; and     means responsive to the non-data command for continuously sending non-data symbols onto the link to maintain a continuous bit stream between said transmit portions.

8. The adapter apparatus of claim 6 wherein the receive buffer includes a data capacity less than a data capacity of the data frame.

9. The adapter apparatus of claim 8 wherein the data capacity of the receive buffer is approximate by 10% of the data capacity of the data frame.

10. The adapter apparatus of claim 4 wherein the data capacity of the transmit buffer is approximately 10% of the data capacity of the data frame.

11. Adapter apparatus in a communication node for maintaining continuity of a data frame between a full duplex communication link and a full duplex communication node where a data frame is processed at a first data rate at the node and is transmitted at a second data rate on the link, said apparatus comprising:

receive buffer means for buffering a receive portion of the data frame as data is received from the link and providing said receive portion of the data for processing by the node;

means for separating non-data symbols and portions of a data frame received from the link and providing said portions as the receive portions to said receive buffer means;

transmit buffer means for buffering a transmit portion of the data from the data frame as data is processed at the node and for providing said transmit portion for transmission on the link;

means for detecting when said transmit buffer means is buffering a predetermined minimum size transmit portion;

inserting means responsive to said detecting means for inserting non-data symbols between transmit portions of the data frame being transmitted on the link when the transmit portion buffered by said transmit buffer means is at the predetermined minimum size, said inserting means repeating the symbols as necessary to maintain a continuous bit stream between said transmit portions in the data frame;

wherein said inserting means further comprises:

receive detect means for detecting said receive buffer means is too full or not too full;

ready means, responsive to said receive detect means, for generating a Ready command indicating said receive buffer is not too full;

busy means, responsive to said receive detect means, for generating a Busy command indicating said receive buffer is too full;

sending means responsive to the Ready command for sending non-data Ready symbols onto the link to maintain data frame continuity between said transmit portions; and         said sending means responsive to the Busy command for sending non-data Busy symbols onto the link to maintain data frame continuity between said transmit portions.

12. Adapter apparatus in a communication node for maintaining continuity of a data frame between full duplex communication link and full duplex communication node where a data frame is processed at a first data rate at the node and is transmitted at a second data rate on the link, said apparatus comprising:

receive buffer means for buffering a receive portion of the data frame as data is received from the link and providing said receive portion of the data for processing at the node;

means for separating non-data symbols and portions of data frame received from the link and providing said portions as the receive portions to said receive buffer means;

transmit buffer means for buffering a transmit portion of the data from the data frame is data is processed at the node and for providing said transmit portion for transmission on the link;

means for detecting when said transmit buffer means is empty or not empty;

first means responsive to the not empty condition for generating a data command indicating transmit portions of the data frame are available for transmission;

second means responsive to the empty condition for generating a non-data command;

means responsive to the data command and said transmit buffer means for sending transmit portions from the node onto the link;

means responsive to the non-data command for continuously sending non-data symbols onto the link to maintain a continuous bit stream between said transmit portions;

means for detecting said receive buffer means is too full;

means responsive to said detecting means for generating a Busy command when said receive buffer means is too full; and means responsive to the Busy command for interrupting transmission of a transmit portion to create a gap for insertion of a Busy non-data symbol.

13. Data frame continuity apparatus in a node at each end of the communication link, said continuity apparatus for handling data capacity mismatches between a node and a communication link in a communication network, data processing apparatus at the node for forming transmit (TX) data frames containing multiple TX data words, the data processing apparatus processing receive (RX) data frames containing multiple RX data words, said continuity apparatus at each end of the communication link comprising:

node interface means for loading TX data words from the data processing apparatus to a TX storage means and for passing RX data words from an RX storage means to the data processing apparatus;

link interface means for interfacing TX data stream and a RX data stream between the node and the communication link;

means in the link interface means for transmitting on the link a TX data stream including the TX data words and non-data symbols;

means in the link interface means for receiving from the link a RX data stream including RX data words and non-data symbols;

said TX storage means in said node interface means for storing TX data words loaded from the data processing apparatus until said transmitting means transmits the TX data words on the link;

said RX storage means in said node interface means for storing RX data words received from said receiving means until said data processing apparatus processes the RX data words;

command means in said node interface means for generating command codes containing information on status of the RX storage means at said node interface means;

encoding means in said link interface means for inserting the command codes into the TX data stream as non-data symbols when TX data words are not being transmitted by said transmitting means; and decoding means in said link interface means for stripping the non-data symbols from the RX data stream and passing said RX data words to said RX storage means and decoding the command codes from the non-data symbols and pasing the command codes as status information to said command means;

said encoding means maintains data stream continuity in the data frames on the communication link by inserting non-data symbol to prevent failure of transmission of a data frame; and said command means receives status information on operations of a continuity apparatus at an opposite end of the communication link.

14. The apparatus of claim 13 wherein said command means comprises:

means for detecting whether the RX storage means contains RX data words filling the RX storage means at least to a predetermined threshold portion of the RX storage means capacity; and first generating means responsive to said detecting means for generating RX storage status command codes indicating whether or not the RX storage means is filled at least to the threshold portion whereby the command codes contain information for the continuity apparatus at the opposite end of the link, the information indicating whether the continuity apparatus at one end is ready to receive data words from the continuity apparatus at the opposite end of the communication link.

15. The apparatus of claim 14 wherein said command means further comprises:

minimum means for detecting whether the TX storage means contains more than a minimum number of TX data words; and second generating means responsive to said minimum means for generating a minimum command code indicating whether or not a minimum number of data words are in the TX storage means.

16. The apparatus of claim 15 wherein said encoding means is responsive to said minimum command code for inserting RX storage status command codes as non-data symbols into the TX data stream when a minimum number of TX data words are not in the TX storage means.

17. The apparatus of claim 14 wherein:

said RX storage status command codes include a Busy command code if the RX storage means is filled at least to the threshold and a Ready command code if the RX storage means is not filled at least to the threshold; and said encoding means is responsive to a Busy command code for inserting the Busy command code into the TX data stream as a non-data symbol.

18. The apparatus of claim 15 wherein the data frames include start and end of frame codes to define the beginning and end of each data frame and said encoding means further comprises:

means responsive to the start of frame code for encoding a start delimiter in the TX data stream at the beginning of the data frame; and means responsive to the end of frame code for encoding an end delimiter in the TX data stream at the end of the data frame.

19. The apparatus of claim 18 wherein said decoding means comprises:

means responsive to non-data symbol codes in the RX data stream for decoding and forwarding the command codes to said command means; and means responsive to the RX data stream for decoding the start delimiter into start of frame code and the end delimiter into end of frame code.

20. The apparatus of claim 19 and in addition:

access control means responsive to the start of frame code for comparing the address of the node to the address carried by the data frame;

means for gating the RX data words to said RX data storage means if said comparing means indicates the data frame address and the node address match; and means for blocking the RX data words from said RX data storage if said comparing means indicates the data frame address and the node address do not match.

* * * * *